United States Patent
Johnson et al.

(10) Patent No.: US 8,051,069 B2
(45) Date of Patent: Nov. 1, 2011

(54) EFFICIENT PREDICATE PREFILTER FOR HIGH SPEED DATA ANALYSIS

(75) Inventors: Theodore Johnson, New York, NY (US); Lukasz Golab, Morris Plains, NJ (US); Oliver Spatscheck, Randolph, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 249 days.

(21) Appl. No.: 12/006,300

(22) Filed: Jan. 2, 2008

(65) Prior Publication Data

US 2009/0171890 A1    Jul. 2, 2009

(51) Int. Cl.
*G06F 17/30* (2006.01)
(52) U.S. Cl. .................................. 707/718; 707/719
(58) Field of Classification Search .............. 707/2, 718, 707/719
See application file for complete search history.

(56) References Cited

U.S. PATENT DOCUMENTS

| | | | |
|---|---|---|---|
| 7,165,100 B2 | 1/2007 | Cranor et al. | |
| 2003/0187977 A1 | 10/2003 | Cranor et al. | |
| 2004/0220904 A1* | 11/2004 | Finlay et al. | 707/3 |
| 2006/0205473 A1* | 9/2006 | Gomez et al. | 463/16 |
| 2006/0218129 A1* | 9/2006 | Muras | 707/3 |
| 2007/0050330 A1* | 3/2007 | Karn et al. | 707/2 |
| 2008/0288444 A1* | 11/2008 | Edwards et al. | 707/2 |

\* cited by examiner

*Primary Examiner* — John E Breene
*Assistant Examiner* — Dennis Myint

(57) ABSTRACT

A method and system are disclosed for operating a high speed data stream management system which runs a query plan including a set of queries on a data feed in the form of a stream of tuples. A predicate prefilter is placed outside the query plan upstream of the set of queries, and includes predicates selected from those used by the queries. Predicates are selected for inclusion in the prefilter based on a cost heuristic, and predicates are combined into composites using a rectangle mapping heuristic. The prefilter evaluates the presence of individual and composite predicates in the tuples and returns a bit vector for each tuple with bits representing the presence or absence of predicates in the tuple. A bit signature is assigned to each query to represent the predicates related to that query, and a query is invoked when the tuple bit vector and the query bit signature are compatible.

23 Claims, 12 Drawing Sheets

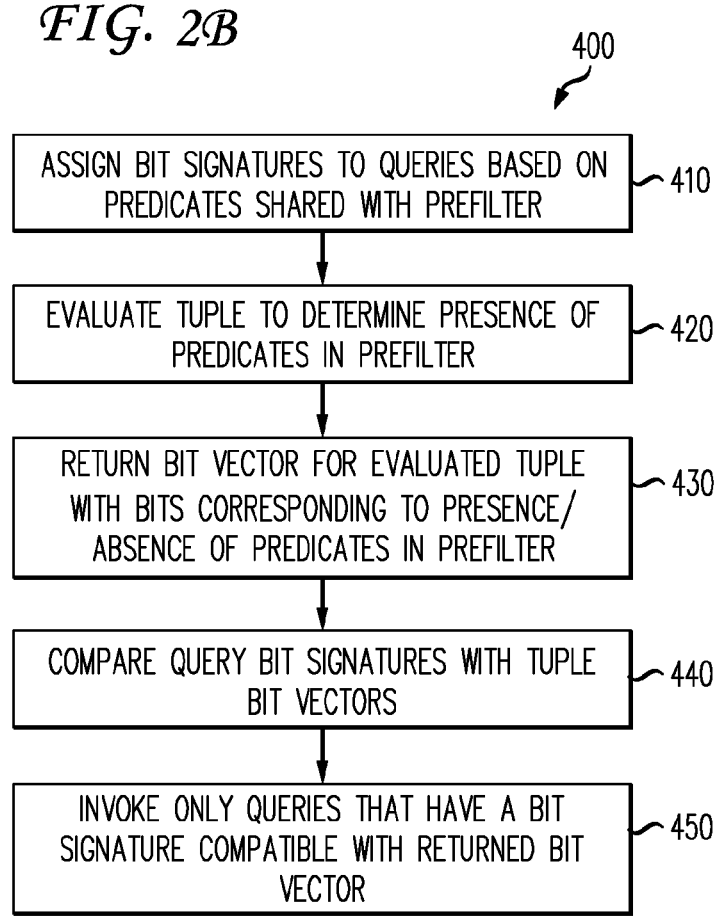

Q1: p1 and p2 and p3
Q2: p1 and p2 and p3 and p4
Q3: p1 and p4
Q4: p1
Q5: p1 and p5 and p6
Q6: p5 and p6

```
1  BASE=RECTS=0
2  For each row r of M
3      Add rectangle corresponding to r to BASE
4      Add rectangle corresponding to r to RECTS
5  For each column c of M
6      Add rectangle corresponding to c to RECTS
7  For i =1 to p-1
8      For each rectangle r(P, Q) ∈RECTS with |P| = i
9          For each rectangle b(P', Q') ∈BASE
10             If |Q ∩ Q'| > 1
11                 Create a new rectangle r'(P U P', Q ∩ Q')
12                 Add r to RECTS
12 Return RECTS
```

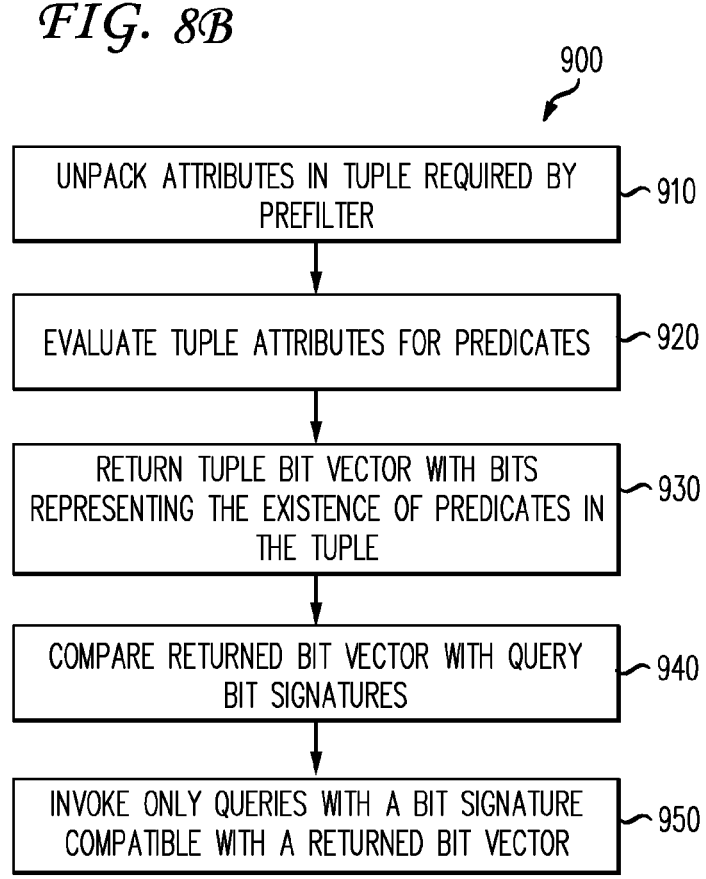

EFFICIENT PREDICATE PREFILTER FOR HIGH SPEED DATA ANALYSIS

FIELD OF THE INVENTION

The present invention generally relates to high speed data analysis, and more particularly to a system and method for organizing the operations that are performed in a query set to be run on a high speed stream of data.

BACKGROUND OF THE INVENTION

A data stream is a continuous sequence of items, generated at a possibly high rate and usually modeled as relational tuples. A tuple is an ordered list of objects or attributes, such as those found in a data packet. A Data Stream Management System (DSMS) monitors the incoming data and evaluates streaming queries, which are usually expressed in a high-level language with SQL-like syntax. Streaming queries usually constitute an infrequently changed set of queries that run over a period of time, processing new tuple arrivals on-the-fly and periodically computing up-to-date results over recently arrived data. An example of such a data stream is the stream of packets transmitted in a Gigabit Ethernet communications network. An example of a DSMS is the AT&T Gigascope processing architecture. The work performed by a DSMS can vary, but for instance, a DSMS may intercept a stream of IP packets and compute queries such as: "every five minutes, return the bandwidth consumed by selected users, applications, or protocols over the most recent five-minute window". Results may be used for intrusion detection, performance tuning, troubleshooting, and user billing.

An important and challenging application of DSMSs involves monitoring high volume (Gigabytes per second) network traffic in near real-time. It is not practical to store a massive data stream locally; therefore there will be permanent data loss if a DSMS cannot keep up with the inputs. In one example, a high speed DAG4.3GE Gigabit Ethernet interface receives approximately 105,000 packets per second (about 400 Mbits per second).

Thus there is a need to provide query processing that can be performed with high throughput, so that near real time processing can occur, without data loss, on a sufficiently large set of queries.

Given that complex stream analyses are often expressed as combinations of simpler pieces, a DSMS workload consists of sets of streaming queries submitted at the same time. Therefore, there exists an opportunity to analyze the queries before they start running and to organize them in ways that enhance throughput.

Predicate pushdown is a known query optimization technique.

One form of predicate pushdown known to the prior art is to identify overlapping parts of queries that would otherwise be re-executed redundantly, and to execute such parts once—a process generally known as multi-query optimization. Such overlapping parts are common in network analysis. For instance, all queries over TCP traffic contain the predicate protocol=TCP in their WHERE clauses. Multi-query optimization as presently practiced is based on selectivity estimates, i.e., predictions of the effect an overlapping query will have on subsequent query processing, that are used to determine which overlapping parts to execute. Selectivity estimates, however, are problematic in much network analysis because data stream composition varies over time.

Another way to increase throughput is by early data reduction. For instance, the AT&T Gigascope DSMS divides each query plan into a low-level and high-level component, denoted LFTA and HFTA, respectively. (FTA stands for filtering-transformation-aggregation, and an arrangement for executing FTAs on a data stream is disclosed in U.S. Pat. No. 7,165,100 B2.) An LFTA evaluates fast operators over the raw stream, and includes operators such as projection, simple selection, and partial group-by-aggregation using a fixed-size hash table. Early filtering and pre-aggregation by the LFTAs are crucial in reducing the data volume fed to the HFTAs, which execute complex operators (e.g., expensive predicates, user-defined functions, and joins) and complete the aggregation. This two-tier architecture, as shown in FIG. 1A, has greatly contributed to the Gigascope's efficiency and successful deployment on high-speed links throughout AT&T's network.

Other prior art techniques for increasing throughput exist. One such technique, known as predicate caching, involves storing the result of a complex operator that will be used by several queries so that complex operations will not have to be repeated.

Another prior art technique is the use of predicate indices, which are used by publish/subscribe systems. However, predicate indices are only useful when there are thousands of predicates on a particular attribute, a property not typically found in the query sets used in network analysis. In the publish-subscribe model, hundreds of events per second are processed against millions of subscriptions. Moreover, it is assumed that the subscription set contains subsets of many similar predicates over the same attribute; e.g., simple predicates of the form attribute op constant, with op $\in \{=,<,>\}$ and constant $\in N$. Predicate indexing is used to narrow down the set of possibly matching subscriptions. In contrast, a high-performance DSMS may process millions of tuples per second against hundreds of queries. Thus, the number of queries that could match a new tuple is already reasonably small and large subsets of similar predicates over the same attribute are less common. While predicate indexing might still be used in a DSMS if justified by the workload, additional issues arise due to the massive data rates encountered by predicates pushed all the way down to the raw stream.

These approaches to increasing data throughput, while effective to a certain degree, are not as fully able as desired to handle high data rates with substantial numbers of queries under the processing restraints necessitated by real time processing of streaming data at high rates. In many cases, the processor cost (meaning the number of operations the processor must perform in order to complete the queries, which correlates to processing time, processing rates and hardware cost) for these approaches is unacceptably high.

Accordingly, there is a need to provide a method for processing query sets on data streaming at high rates while reducing processor utilization cost. There is a further need to provide a data stream management system that is able to process query sets on data streaming at high rates without excessive processor cost.

BRIEF SUMMARY OF THE INVENTION

Briefly, the present invention is a method and system for prefiltering data streams in a data stream management system that processes sets of queries on data streams.

The method includes providing a prefilter in which, in one aspect, predicates are selected from among those present in the queries and evaluated on tuples before the queries are run. In an exemplary embodiment, a tuple has the selected predicates evaluated in the prefilter and the evaluation outcomes are entered into a bit map or vector. The queries are assigned bit signatures to correspond to the predicates in the query. The queries are run on the tuple only if the query bit signature has matches in the tuple bit vector.

In another aspect of the invention, predicates are selected for the prefilter by identifying all the predicates in the query set, determining a predicate cost threshold C and including those predicates in the prefilter that are below the cost threshold C. In a further aspect of the invention, the predicates selected as below the cost threshold C are combined in a multi-query optimization step to avoid repeated execution of the same predicate. Predicates are combined in a method that includes creating a matrix representation of predicates in queries, and solving a graph-covering problem on the matrix, thereby minimizing the number of bits needed to represent the predicates present in the queries. In another aspect of the invention, predicates are combined using an efficient rectangle covering heuristic.

In another aspect of the invention, there may be a hardware dependent limit on the number of bits available to use in the prefilter and the query signatures, i.e., the "bit budget" will be constrained. For instance, a 64-bit processor can perform efficient operations on up to 64 bits using one register-compare. Furthermore, in some cases, a query may be installed directly on a network interface card of the Gigascope host machine. If so, then the bit budget may be even smaller to reflect the limited processing capabilities of network hardware, e.g., 16 bits. In such instances, the invention provides that the prefilter will be populated with combined predicates and others to the extent of the available bits in the bit budget.

A method and system in accordance with the foregoing features is able to perform aggressive early data reduction and avoid not only redundant processing of shared predicates, but also the high cost of query invocations on tuples with non-shared predicates. The DSMS predicate migration heuristic of the present invention reduces the workload of the LFTAs and does not require accurate selectivity estimates. Using a real-life network monitoring query set, we show that the performance of AT&T's Gigascope DSMS is significantly improved by the prefilter—in one example, the expected number of LFTA invocations per tuple decreased from 50 to 10 with use of the prefilter, and CPU utilization percentages decreased from over 80% to under 50%. These results were obtained with a 36 bit budget, and it was found that very large improvements were available with a bit budget of as little as 10.

These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

FIG. 2B is a flowchart showing a method for operating a prefilter according to the invention in a DSMS.

FIG. 8B is a flowchart of a method for operating the prefilter developed according to FIG. 8A.

FIGS. 9-13 show experimental parameters and results of a prefilter used in an existing DSMS, in which:

FIG. 9 is a matrix representation of the query set used in the experiment.

FIG. 10 is a graph comparing the running times of the rectangle covering heuristic of the present invention compared to an exhaustive solution.

FIG. 11 is a graph showing the effectiveness of the rectangle covering heuristic.

FIG. 12 is a graph showing LFTA invocations as a function of the number of bits in a prefilter bit budget.

FIG. 13 is a graph showing CPU utilization percentages as a function of the number of bits in a prefilter bit budget.

DETAILED DESCRIPTION OF THE INVENTION

Figure 1A:
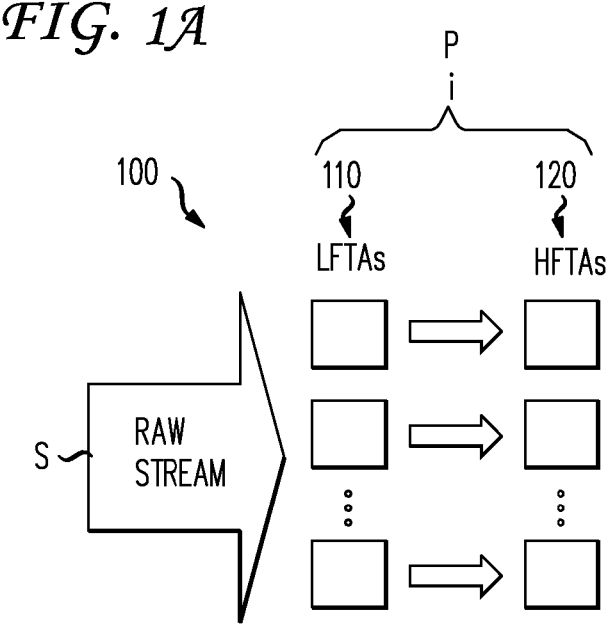
FIG. 1A shows an example of a DSMS architecture.

FIG. 1A shows the architecture of the prior art Gigascope DSMS 100, which receives a data stream S of individual tuples and performs a query plan P. The DSMS 100 divides the query plan P into a low-level component 110 and a high-level component 120, denoted LFTA and HFTA, respectively. An LFTA query evaluates fast operators over the raw stream, such as projection, simple selection, and partial group-by-aggregation using a fixed-size hash table. Early filtering and pre-aggregation by the LFTAs are crucial in reducing the data volume fed to the HFTAs, which execute complex operators (e.g., expensive predicates, user-defined functions, and joins) and complete the aggregation.

Figure 1B:
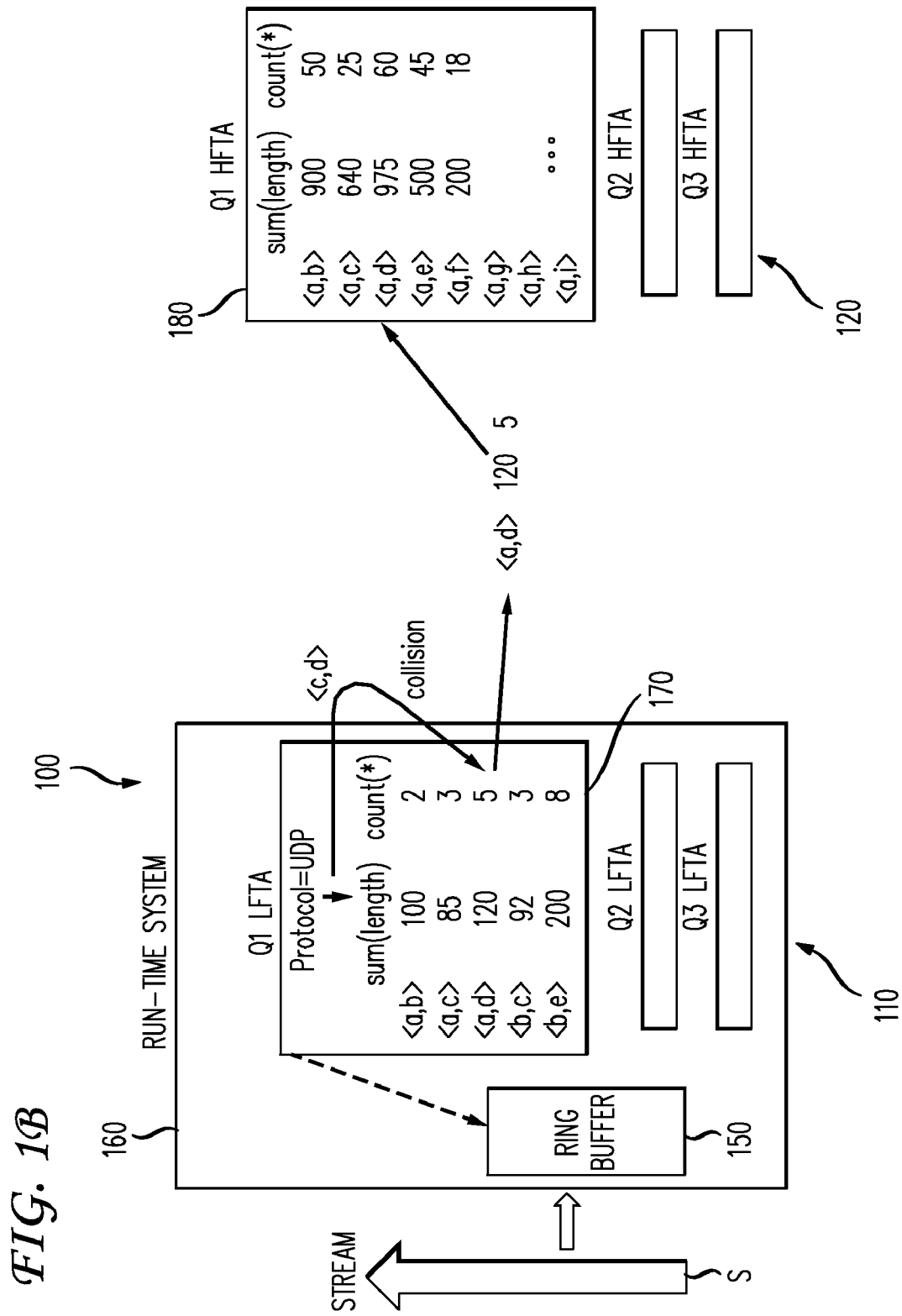
FIG. 1B is a diagram of query processing in the DSMS architecture of FIG. 1.

FIG. 1B shows an example of query processing in the Gigascope DSMS 100 of FIG. 1A. The Gigascope DSMS 100 features a high-level query language with SQL-like syntax. Supported operators include projection, selection, aggregation, grouping, stream-merge, stream-join, and user-defined functions. The input and output of each operator (and each query) is a stream, which enables query composition and simplifies the semantics. Gigascope provides a set of schemas corresponding to well-known protocols, protocol layers, and applications (e.g., Netflow® records, raw packets, layer-2-Ethernet, IP, TCP, UDP). This allows users to reference protocol-specific or application-specific fields in their queries without manually specifying how to extract them from the data packets.

Since streams S are unbounded, a blocking operator such as aggregation would never produce any output. Aggregation may be unblocked by defining windows over the stream by way of a temporal group-by attribute. For instance, consider a query Q1 that is to compute the bandwidth usage (i.e., the sum of packet lengths) and packet count of UDP traffic for each source-destination address pair. Suppose that we want to compute Q1 over non-overlapping windows of length one minute each and return answers at the end of each window. Assuming that the time attribute is measured in seconds, Q1 can be written as:

```
SELECT t, srcIP, destIP, sum(length), count(*) FROM
UDP
WHERE protocol=UDP
GROUP BY time/60 as t, srcIP, destIP
```

Note that Q1 references a UDP schema, therefore the Gigascope DSMS 100 can find the srcIP, destIP and length attributes inside each UDP packet. However, the predicate protocol=UDP must be evaluated in the query plan because the reference to UDP in the FROM clause only specifies the packet schema; it does not automatically filter out non-UDP packets from the stream.

FIG. 1B shows how Gigascope evaluates the query Q1 along with the two other queries Q2 and Q3. For clarity, only the details of the LFTA and HFTA of Q1 are shown, and source and destination IP address pairs are represented as pairs of letters <i, j>. A new tuple is placed in the ring buffer 150 upon arrival. The Gigascope runtime system 160 then calls the Q1 LFTA with a pointer to the new tuple. The LFTA first extracts the required attributes from the raw packet according to the specified schema. The extracted attributes include those referenced in the selection predicates assigned for evaluation at the LFTA, the grouping columns, and the aggregation functions. Next, the LFTA evaluates its selection predicates, and, if the tuple matches the predicates, updates its hash table 170. The hash table has fixed size and stores partial aggregates for selected groups (the hash table size of an LFTA can be set by the user when issuing the query). In order to ensure that partial aggregation is done quickly, the hash table cannot be very large—it is typically much smaller than the total number of groups in the current window. Therefore, collisions may occur. As illustrated in FIG. 1B, the new tuple with source and destination addresses <c,d> collides with the existing group <a, d>. In this case, the pre-aggregated values of sum(length) and count(*) for group <a,d> are ejected from the hash table, placed in an output buffer (not shown) accessible by the Q1 HFTA, and replaced with the values for group <c,d> obtained from the new tuple. The runtime system 160 then calls the remaining LFTAs to process the new tuple. HFTAs are executed as separate processes scheduled asynchronously by the operating system, typically with lower priority than the run-time-system process.

Note that the Q1 HFTA maintains a complete aggregate table 180 with each group having a separate entry. The table is used to aggregate the partial sums and counts produced by the LFTA. This process is similar to sub-aggregate and super-aggregate computations in data cubes. Furthermore, recall that Q1 is set to produce aggregates over one-minute windows, therefore at the end of each minute, Q1 LFTA must flush its hash table 170 and propagate the partial aggregates to the HFTA (lazy flushing may also be performed).

For efficiency, LFTAs are translated into C code and linked directly to the runtime library. They also read tuples directly from the raw stream without memory-copy overhead, and only evaluate simple operators. As already mentioned, there are cases when an LFTA may be executed partly or wholly on a network interface card. Furthermore, the Gigascope runtime system 160 executes each LFTA serially inside a single process. Serial execution of the LFTAs avoids the complexity of multi-threading, eliminates the need to maintain multiple pointers into the ring buffer, and exploits cache locality as all the LFTAs process a new tuple before moving on to the next one. As will be understood from the description below of the prefilter according to the present invention, the serial execution model of the DSMS 100 easily accommodates the prefilter: the run-time system executes the prefilter predicates upon arrival of a new tuple, and invokes an LFTA only if its signature matches the prefilter bit vector.

To avoid the overhead of dynamic linking, the set of LFTAs 110 cannot be changed without stopping and re-linking the runtime. However, each HFTA is a separate process, therefore new HFTAs may be added on-the-fly and connected to the output streams of one or more existing LFTAs. In general, an HFTA can be attached to several LFTAs—for instance, a join of two streams requires two LFTAs to read the inputs and evaluate simple predicates over individual streams, and an HFTA to compute the join and any predicates referencing attributes of both streams. Furthermore, multiple HFTAs can read the output of one LFTA.

Splitting a set of query operators into an LFTA and an HFTA is a complex optimization problem. However, the split between LFTA and HFTA queries is transparent to the users, and the split attempts to execute as much of a query as possible at the LFTA in order to take advantage of early data reduction.

The two-tier architecture of the prior art Gigascope DSMS 100, as shown in FIG. 1A, has greatly contributed to its efficiency and successful deployment on high-speed links throughout AT&T's network. Even so, as data streams S increase in speed, and query plans P introduce new queries, CPU capacities become strained.

Figure 2:
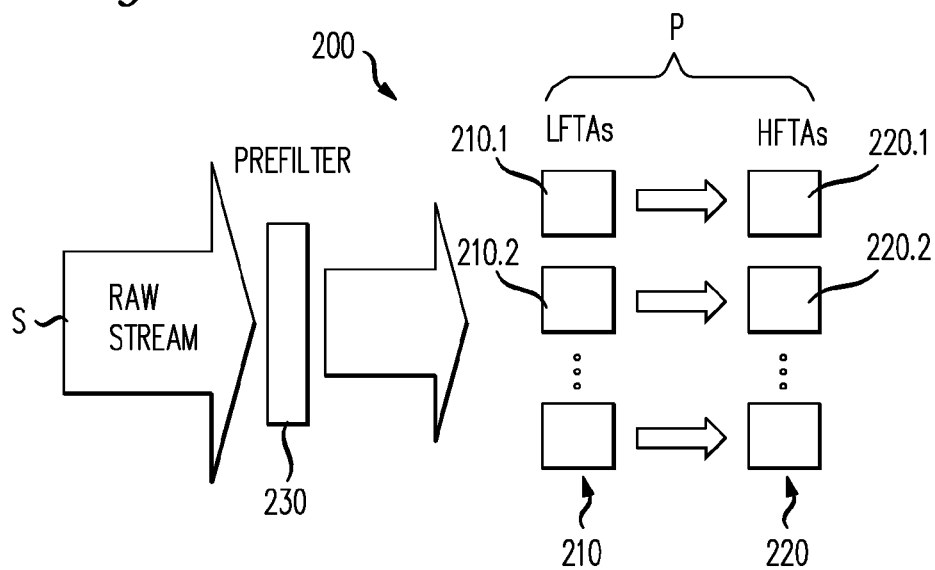
FIG. 2 shows an example of DSMS architecture modified with a prefilter according to the present invention.

FIG. 2 shows the architecture of a DSMS 200 in accordance with the present invention, which includes a query plan P with a two-tier architecture of LFTA queries 210 and HFTA queries 220 as described above, and in which a prefilter 230 is positioned outside of the query plan P and upstream of the LFTA queries 210 to examine tuples arriving in stream S. The LFTA queries 210 comprise a set of individual queries 210.1, 210.2, etc., and the HFTA queries 220 comprise as set of individual queries 220.1, 220.2, etc.

The insight behind the prefilter 230 is as follows. We observed that invoking a query plan component (i.e., an LFTA) in response to a newly arrived tuple is significantly more expensive than evaluation of a simple scalar comparison such as protocol=TCP. Furthermore, many queries in a large stream analysis query set are effectively looking for "needles in haystacks". That is, they refer to a small fraction of the data; e.g., network traffic corresponding to a rare protocol or packets generated by a particular application. However, to perform the query set we must examine the entire stream S (i.e., invoke at least the LFTA of each query for each newly arrived tuple) in order to find these valuable rare packets. Hence, we can reduce the performance bottleneck by pushing down a set of simple predicates and evaluating them immediately after a new tuple arrives. Then, if a pushed-down predicate belonging to the $i^{th}$ query fails, we do not invoke the corresponding part of the query plan (i.e., the $i^{th}$ LFTA) for this tuple. Moreover, if a predicate in the pushed-down set occurs in more than one query, then we evaluate it only once.

The role of the prefilter 230 in the DSMS 200 illustrated in FIG. 2 can be explained as follows: In effect, prefilter 230 forms an additional (shared) query plan component that: 1) performs data reduction earlier and more aggressively by eliminating a portion of LFTA 210 invocations and 2) incorporates multi-query optimization by avoiding repeated execution of the same predicate. In turn, the overall LFTA workload decreases, which enables DSMS 200 to handle higher data rates without dropping packets. While predicate pushdown as a general concept is known, the present inventors believe that no prior arrangement has utilized a prefilter, as here, that implements predicate pushdown outside the query plan P.

Figure 2A:
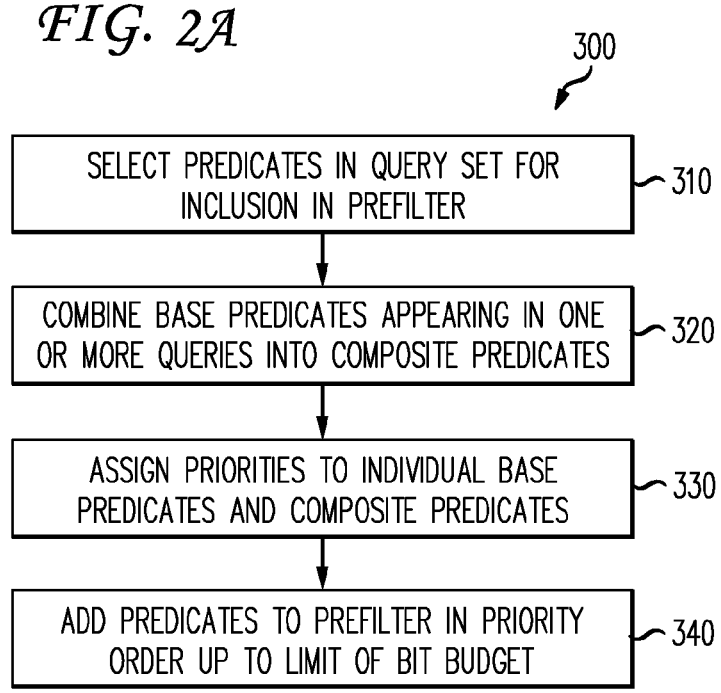
FIG. 2A is a flowchart showing a method for developing a prefilter according to the invention.

FIG. 2A is a flowchart showing a method 300 for constructing prefilter 230 in accordance with the present invention for use with a query plan P including a query set such as that defined by the LFTA set 210. In step 310, predicates existing in the query set 210 are selected for inclusion in the prefilter using a cost test, to be described in greater detail below. In step 320, predicates selected in step 310 and appearing in more than one query are combined into composite predicates using a rectangle covering heuristic, to be described in greater detail below.

If the bit budget allowed by the processing hardware in the DSMS 200 is less than the total number of individual and composite predicates remaining after predicates have been combined in step 320, then steps 330 and 340 are performed. In step 330, the individual and composite predicates are assigned a priority. In step 340, the predicates are added to the prefilter in priority order up to the limit of the bit budget.

FIG. 2B is a flowchart showing a method 400 for operating the DSMS 200 with a prefilter 230 constructed as shown in FIG. 2A. In step 410, each of the queries in set 210 is assigned a bit signature based on the predicates it shares with the prefilter 230. For example, prefilter 230 might have five predicates p1 through p5, and an individual query such as 210.1 in the set of queries 210 might have a bit signature 00011 if it requires the presence of the $4^{th}$ and $5^{th}$ predicates in prefilter 230 but not the $1^{st}$, $2^{nd}$ and $3^{rd}$ predicates in prefilter 230.

In step 420, a tuple in the stream S is evaluated to determine the presence of predicates in prefilter 230. As will be discussed below, the evaluating step may include steps of unpacking attributes in the packet for comparison, and evaluating the unpacked attributes with predicates in the prefilter.

In step 430, a bit vector or bitmap is returned for the evaluated tuple with a bit corresponding to a predicate (individual or combined) in the prefilter 230 only if the predicate evaluates to true. For example, a tuple in stream S would return a bitmap 10011 if predicates p1, p4 and p5 were evaluated as true in the tuple, and predicates p2 and p3 were false.

In step 440, the bit signatures assigned to the queries 210 are compared with the bitmaps returned for the individual tuples to determine if the query bit signature is compatible with the returned bitmap. In the example given above, the bit signature 00011 for query 210.1 would be compared with the bitmap 10011 returned for the evaluated tuple. The comparison would show the tuple possessed the $4^{th}$ and $5^{th}$ predicates required by the query.

In step 450, only those queries 210 that have bit signatures compatible with the returned bitmap for a tuple are invoked on the tuple. In the example given, the query 210.1 signature was compatible with the tuple bitmap and query 210.1 would be invoked on the tuple. Because only compatible LFTAs are invoked, CPU loads are decreased. As will be explained below, one experimental result indicates that prefilters 230 constructed according to the method 300 (FIG. 2A) and operated according to the method 400 (FIG. 2B) can reduce CPU workloads in a DSMS from above 80% to below 50% in some cases.

The following explanation provides further background and detail on the selection step 310 and combining step 320 in the method 300 described in FIG. 2A for developing prefilter 230.

Figure 3:
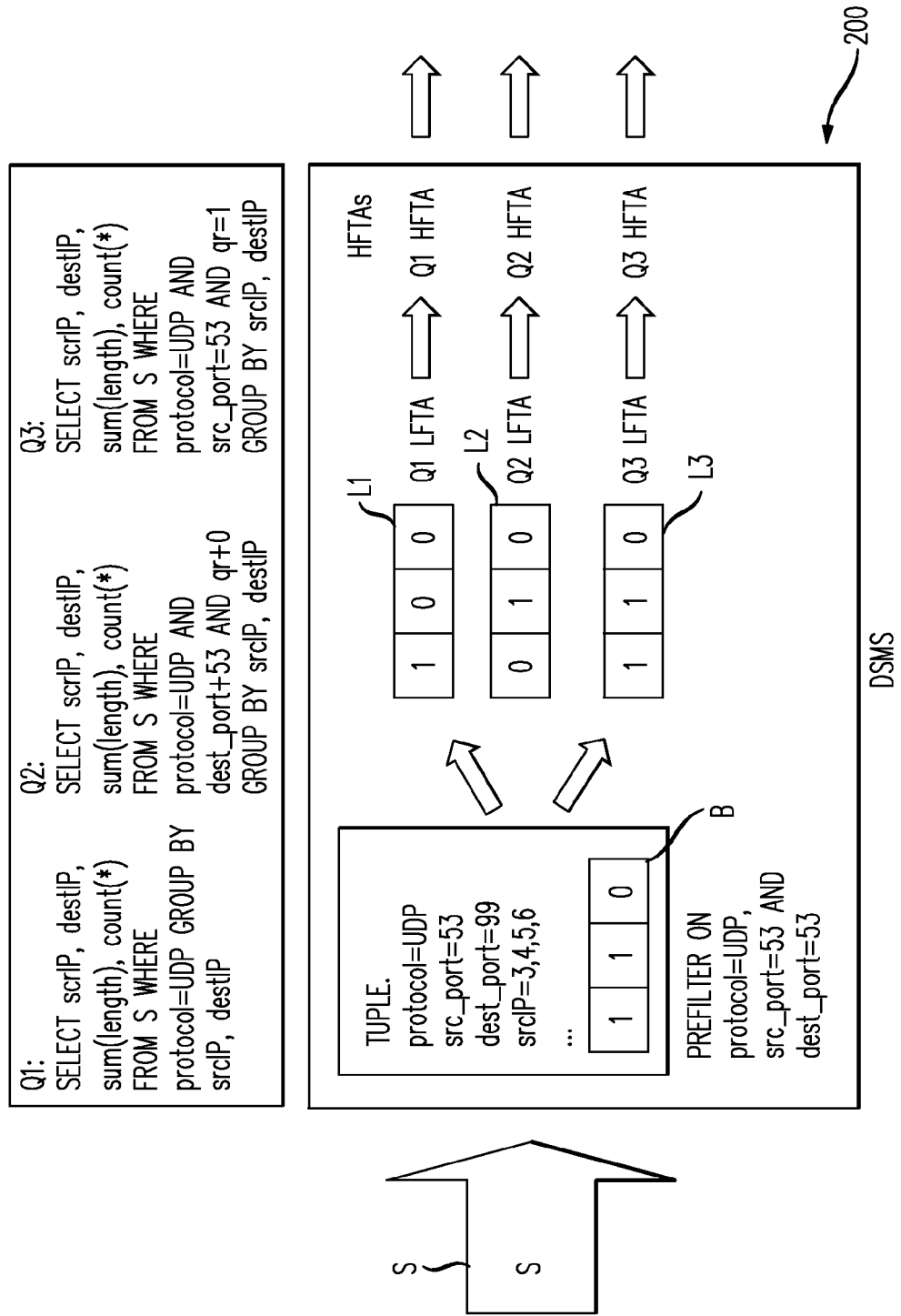
FIG. 3 is a diagram of an example of multi-query processing using a prefilter according to the invention.

FIG. 3 shows an illustrative example of the operation of DSMS 200 with prefilter 230, running three illustrative network monitoring queries 210 denominated Q1, Q2 and Q3. Q1 computes the bandwidth usage (i.e., the sum of packet lengths) and packet count of UDP traffic for each source-destination address pair. Q2 and Q3 compute the same aggregates over DNS requests and responses, respectively (DNS servers listen on port 53 while qr is a Boolean field in the DNS packet header that distinguishes requests from responses). Time window specifications are omitted for brevity. Note that all the predicates occurring in the three queries are simple scalar comparisons; therefore they would normally be evaluated at the corresponding LFTAs. Suppose that the following predicates are pushed down to the prefilter: protocol=UDP, src_port=53, and dest_port=53. Each LFTA is labeled with a bit signature, denoting which of the three pushed down predicates are included in the corresponding query. We denote the signature of the $i^{th}$ LFTA as Li. Thus, since Q3 contains the first and second prefilter predicates, then L3= 110. Whenever a new tuple arrives, the three predicates are evaluated at the prefilter 230 and their outcomes entered into a bit vector B. In the example of FIG. 3, the new tuple satisfies the first two prefilter predicates, therefore B=110. Assuming that the WHERE clause of each query contains a conjunction of predicates, we then invoke the $i^{th}$ LFTA only if B & Li=Li, where & is the bitwise-AND operation. That is, an LFTA is invoked only if each of its pushed-down predicates evaluates to true. The invoked LFTAs (Q1 and Q3 in the example of FIG. 3) then evaluate any remaining simple predicates that have not been pushed down to the prefilter 230 and produce partial aggregates (e.g., the Q3 LFTA evaluates the predicate qr=1). Finally, if needed, the corresponding downstream HFTAs 220 compute expensive predicates and other expensive operators (there are none in this example), and complete the aggregation. Note that: (1) the shared predicate protocol=UDP is evaluated only once per tuple, (2) we avoid the cost of initializing the LFTA of Q2 for this tuple, (3) simple bit operations are sufficient to determine which LFTAs to execute over a new tuple. This example illustrates the processing reduction advantages of using a prefilter.

We turn now to the step 310 of selecting which predicates are to be pushed down to the prefilter 230 from the set of queries 210.

Types Of Frequently Occurring Predicates In Network Monitoring Queries.

In reviewing predicates occurring in commonly used query sets 210, a first observation is that network protocols are layered. For example, HTTP is an application-level protocol that uses TCP at the transport layer, i.e., the HTTP data are contained in the TCP packet payload. This means that any query referencing applications over TCP requires the predicate protocol=TCP in addition to specific predicates that identify the particular application. For instance, HTTP packets may be identified by the presence of the strings "GET" (request) or "HTTP" (response) at the beginning of the TCP packet payload.

A second observation is that (unicast) network traffic is bi-directional: there is a source and a destination (IP address and/or port). Network analysts often pose queries that demultiplex selected traffic streams, which are then joined (at the HFTA) on the source and destination identifiers. Results are then used to, e.g., track the latency between client requests and server responses. Specific examples of demultiplexed streams include HTTP requests and responses (as discussed above) and DNS requests and responses, which correspond to the exemplary queries Q2 and Q3, respectively, from FIG. 3. Note that queries Q2 and Q3 contain a shared predicate that selects DNS traffic, and two specific predicates each, which perform the demultiplexing.

Third, network analysts want to eliminate fragmented, empty, or otherwise irrelevant packets from reaching some of the queries and possibly skewing aggregation results. This may be done by appending predicates such as offset=0 or data_length<>0. The former specifies that either the packet has not been fragmented or it is the first fragment (fragmentation refers to splitting of IP packets by link layer protocols that cannot handle large packet sizes). This is done for queries that only access header fields, which are always found at the start of a packet (i.e., in the first fragment; the remaining fragments contain the payload of the original packet). The latter predicate drops packets with an empty payload and is added to queries that reference the payload in addition to the header (this is very common since packets produced by higher-level protocols such as TCP are encapsulated in lower-level packets such as IP, therefore a TCP header is contained in the payload of an IP packet).

Generalizing the above observations, we expect to find a number of shared simple predicates across a set of network monitoring queries 210, referencing common protocols, applications, port numbers, and control fields inside packet headers. This motivates the multi-query optimization goal of the prefilter. Additionally, we expect to find non-shared predicates corresponding to application-specific filtering or demultiplexing. This motivates the data reduction goal of the prefilter as these more specific predicates may be highly selective.

Finally, in addition to the simple predicates described thus far, users may include expensive predicates and functions for complex analysis. These are usually more specialized and therefore may not occur in more than one query. Some are inexpensive enough to be evaluated at the LFTAs 210, whereas others are very expensive and must be done at the HFTAs 220. Examples of LFTA-compatible complex predicates include regular expression matching within packet headers. For instance, one can often determine which application has produced a packet by scanning the payload for strings such as "KaZaA", "gnutella", "BitTorrent", or, as mentioned earlier, "GET" or "HTTP". Note that each application corresponds to a different regular expression. Longest prefix matching is another example, where a source or destination IP address is compared against a set of IP address prefixes stored in a main-memory table. Thus, a longest prefix match predicate may be used to restrict the query to a specific subnet or a specific set of IP addresses.

Selecting the Predicates to Include in the Prefilter.

The first step in creating the prefilter 230 is to choose which predicates to push down from the LFTAs 210. We assume a query plan P giving rise to n LFTAs $210.1, 210.2, \ldots 210.n$ (the number of HFTAs is not relevant in terms of the prefilter). Note that the total number of queries may be larger than n because some queries may subscribe to the output of others and therefore do not need an LFTA. Without loss of generality, we assume a single input stream. The case of multiple inputs is handled by assigning independent prefilters containing predicates over their respective streams, whereas predicates over multiple streams are computed at the HFTAs.

We assume that each LFTA contains a conjunction of zero or more base predicates. Two base predicates are said to be equivalent if they are syntactically the same (modulo normalization, as in traditional DBMSs (data base management systems)). Each unique LFTA (base) predicate is associated with a cost and, optionally, a selectivity estimate, with the caveat that the latter may not be accurate throughout the lifetime of the query set.

One possibility for selecting predicates for the prefilter 230 is to employ traditional multi-query optimization techniques, which consider pushing down shared predicates in order to induce common sub-expressions in the global query plan, even if the resulting orderings are locally sub-optimal. These decisions are made with the help of predicate cost and selectivity estimates. However, there are several drawbacks to this approach in the context of a high-performance DSMS 200. First, the available selectivity estimates may become inaccurate over time due to the time-evolving nature of streaming data and the long-running nature of streaming queries. Second, in addition to pushing down shared predicates to avoid doing redundant work, it is desirable to reduce the high cost (relative to simple predicate evaluation) of LFTA invocations. This means that even simple non-shared predicates (e.g., src_port=53 and dest_port=53 in the example of FIG. 3) are prefilter candidates. Traditional multi-query optimization techniques do not address this consideration.

An exhaustive multi-query optimization solution (for building an optimal global plan) attempts to push down each subset of the LFTA base predicates, estimates the expected cost of each alternative, and optimizes for lowest cost using standard computer optimization programs. In addition to being prohibitively expensive to compute, this technique requires accurate selectivity estimates and an assumption, not always well founded, that the estimates will hold for a useful lifetime of the prefilter 230.

The present invention uses a DSMS predicate migration heuristic that both reduces the workload of the LFTAs and does not require accurate selectivity estimates.

In accordance with the present invention, predicates are selected for inclusion in a prefilter 230 by means of a simple and robust heuristic. First, we set C to be the maximum cost of a base predicate that may be considered "cheap". The cost C may be measured in terms of the number of operations performed in evaluating the presence of a base predicate. The value of C should be much smaller than the cost of LFTA invocation (as an example, in a current implementation of the prefilter, the cost threshold C=10 operations). The remaining LFTA base predicates are labeled "expensive" (not to be confused with "very expensive" predicates and functions computed at the HFTAs). Then, we simply select all the cheap base predicates (shared or otherwise) for inclusion in the prefilter 230.

Figure 4:
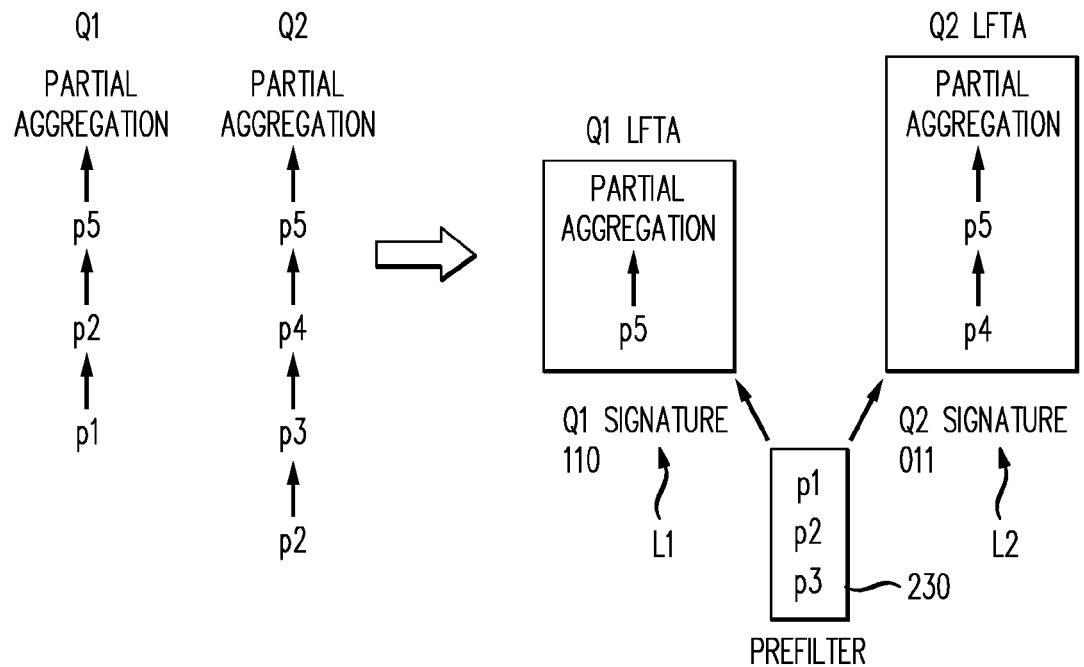
FIG. 4 is a diagram illustrating an example of combining individual query plans into a shared prefilter.

An example of the application of our heuristic is shown in FIG. 4. On the left, LFTA query plans are shown for two queries: Q1 and Q2. Both queries are assumed to perform some grouping and aggregation, the details of which are not relevant to the prefilter. The WHERE clause of Q1 is p1 and p2 and p5, while the WHERE clause of Q2 is p2 and p3 and p4 and p5. Suppose that p1 through p3 are cheap (as determined by comparison to a cost threshold C) and that the illustrated query plans are locally optimal, i.e., the base predicates of both LFTAs are ordered in an optimal way. The right side of FIG. 4 shows the corresponding prefilter with all the cheap base predicates pushed down to the prefilter (the corresponding HFTAs are omitted for clarity).

The advantages of the selection heuristic used in the present invention are as follows. First, the cost of evaluating a predicate is expected to be more stable over time than its selectivity. Additionally, even if predicate selectivities are known to be accurate and could be used to calculate optimal local plans, chances are good that cheap base predicates are still ordered early in an invoked query, unless they are very non-selective. Therefore, pushing down cheap base predicates is likely to create an efficient and robust global plan. Second, recall from the discussion above that many shared predicates typically encountered in network analysis are expected to be inexpensive. Therefore, in the context of multi-query optimization, pushing down all the cheap base predicates induces common sub-expressions that would not exist if only the locally optimal plans were considered. For instance, the two queries in FIG. 4 share the cheap base predicate p2, but this predicate could not be "factored out" unless we flipped the execution order of p1 and p2 in Q1's plan. In other words, our heuristic implicitly considers locally non-optimal plans when building the global plan. Finally, from the point of view of reducing the number of LFTA invocations, cheap non-shared predicates should be pushed down aggressively; in comparison, the relative cost savings of evaluating an expensive non-shared predicate before an LFTA query are far less significant.

One consequence of preventing expensive predicates from being evaluated at the prefilter is that shared expensive predicates, if any, are re-executed redundantly. For instance, in the example of FIG. 4, predicate p5 is an expensive base predicate computed both at the Q1 LFTA and the Q2 LFTA. However, adding p5 to the prefilter may not be optimal as it would reverse the order of evaluation of p4 and p5 in Q2. If p5 is much more expensive and/or much less selective than p4, then the resulting global plan could be inefficient despite shared evaluation of p5. One alternative is to push down p4 as well and evaluate it in the prefilter before p5. However, this approach presents two problems. First, in the worst case, all the LFTA base predicates would have to be pushed down, defeating our goal of keeping the prefilter bit vector B short. Second, the prefilter evaluation logic would have to be more complex in order to avoid unnecessary evaluation of expensive predicates; e.g., in FIG. 4, we would first compute the cheap base predicates, then p4, then p5, but only if either p4 evaluated to true, or p1 or p2 evaluated to true.

Rather than computing expensive base predicates at the prefilter, it is preferable to include only cheap predicates in the prefilter 230 and to cache the outcomes of shared expensive predicates in a separate data structure (not shown). This way, if the Q1 LFTA in FIG. 4 is invoked and computes p5, the Q2 LFTA can look up the result of p5 in the predicate cache.

Accordingly, the present method selects predicates for inclusion in the prefilter 230 by comparing the cost of predicates to a preselected value C and selects predicates with a cost of C or less for inclusion in the prefilter 230.

We turn now to the step 320 of combining selected predicates to form composite predicates.

Combining Selected Predicates in the Prefilter.

It is desirable in prefilter design to assign a small number of bits to represent the pushed-down predicates in bit vector B and in query bit signatures Li, while still being able to avoid all unnecessary LFTA invocations.

As explained with reference to FIGS. 2B and 3, the prefilter 230 must be executed for each new tuple, and therefore keeping up with the raw data stream is of utmost importance. It is therefore necessary to implement the prefilter 230 so that its computational overhead does not defeat the performance gains of early data reduction. As described with reference to FIGS. 2 and 2B, the prefilter 230 performs two tasks: evaluation of selected predicates and identification of parts of the shared query plan to execute via bit comparisons. The former would have to be done anyway (at the LFTAs) in the absence of the prefilter, but the latter step of identification represents a source of overhead. Clearly, longer bit vectors B and query signatures Li are more expensive (in terms of processor use) to compare.

Moreover, the prefilter 230 operates in a resource constrained environment. In particular, there may be a hardware dependent limit on the number of bits to use in the prefilter for the tuple bit vector B and the LFTA signatures Li. For instance, a 64-bit processor can perform efficient operations on up to 64 bits using one register-compare. Furthermore, in some cases, an LFTA query 210 may be installed directly on a network interface card of the host machine. If so, then the bit budget may be even smaller to reflect the limited processing capabilities of network hardware, e.g., 16 bits.

In response to the processing overhead and hardware constraints on bit vector length, the present invention minimizes prefilter overhead by representing the set of predicates selected to be pushed-down (using the cost heuristic described above) by using a small number of bits. Recall the example of FIG. 3 and suppose that we want to evaluate all five unique predicates in the prefilter, i.e., protocol=UDP, dest_port=53, src_port=53, qr=0, and qr=1. A naive solution requires a prefilter bit vector B and query signatures Li of size five bits. However, instead of spending one bit on each distinct predicate, we may assign a conjunction of several predicates to a single bit, so long as we can still determine that an LFTA does not have to be invoked if at least one of its predicates has failed in the prefilter. For example, we can keep the first bit the same, change the second bit to src_port=53 AND qr=1, and change the third bit to dest_port=53 AND qr=0. This way, we do not increase the bit vector sizes (in fact, we can use exactly the same query bit signatures as before), yet we can push down two additional predicates into the prefilter 230. Using the fewest possible bits to represent a set of predicates can be formalized as a bipartite graph covering problem. It can be proven that the problem is NP-hard. We propose efficient heuristics for arriving at solutions to the problem which avoid exhaustive analysis yet yield results very close to those obtained with exhaustive analysis (at least in instance where we have been able to compare such results).

We define a composite predicate as a conjunction of two or more base predicates. The task is to assign bits to composite, rather than base, predicates and thereby reduce the number of bits needed to represent the prefilter predicates.

To illustrate the difficulty of this task, suppose that we want to use only one bit for the prefilter in FIG. 4. One possibility is to assign the bit to the composite predicate (p1 and p2 and p3), i.e., the conjunction of all the base predicates designated for execution at the prefilter. If the bit is false when evaluated over a newly arrived tuple, then we know that at least one of p1, p2, or p3 failed. However, we cannot determine which of these base predicates has failed, and therefore we cannot avoid executing the LFTA 210 queries Q1 and Q2.

To formalize the problem at hand, let n be the number of LFTA queries and p be the number of unique base predicates evaluated at the prefilter, as determined in the previous step (comparison to a threshold cost C). Let M be a p-by-n boolean matrix and $M(i, j)$ be the entry in its $i^{th}$ row and $j^{th}$ column. Define $M(i, j)$ to be 1 if the $i^{th}$ base predicate is referenced in the query corresponding to the $j^{th}$ LFTA query. Otherwise, $M(i, j) = 0$. The following definitions will be used in our formalization.

Definition 1. Let P and Q be subsets of the rows and columns of M, respectively. P and Q define a rectangle $r(P,Q)$ if for each $i \in P$ and $j \in Q$, $M(i, j)=1$.

Definition 2. A rectangle covering of M is a set of rectangles defined over M such that each non-zero entry in M is in at least one rectangle.

Figure 5:
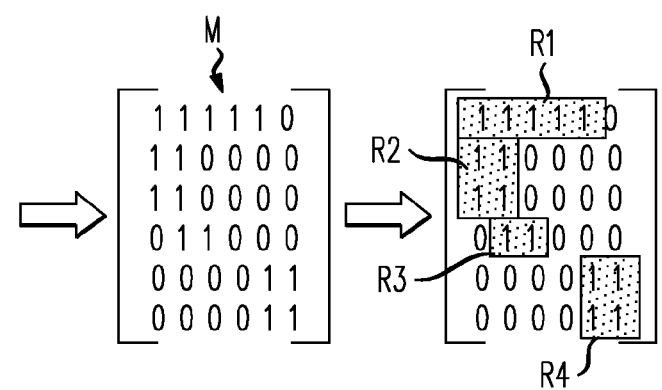
FIG. 5 is a diagram showing a technique for combining predicates according to the invention.

We can now express the problem of minimizing the length of the prefilter bit vector (and avoiding all the LFTA invocations that would be avoided if each base predicate was assigned a separate bit) as finding a minimum-sized rectangle covering of M. An example is illustrated in FIG. 5, showing a workload of six queries Q1 through Q6 and their predicates p1 through p6, the corresponding matrix M and a minimum-sized rectangle covering (of size four). The four rectangles R1 through R4 denote respectively the following predicates to be evaluated at the prefilter: p1, (p2 and p3), p4, and (p5 and p6). For the six illustrative queries Q1 through Q6, the corresponding LFTA bit signatures Li are: L1=1100, L2=1110, L3=1010, L4=1000, L5=1001, and L6=0001. Thus, we require only four bits (i.e., four composite predicates) to represent the six unique base predicates in the workload, and this configuration is equivalent, in terms of avoiding LFTA invocations, to assigning one bit per base predicate. Note that for simplicity, we have illustrated a minimum-sized rectangle cover that does not contain any overlapping rectangles; we will deal with overlap below in the context of efficient evaluation of prefilter predicates.

Finding a minimum-sized rectangle covering of a boolean matrix M is an NP-hard problem as it can be reduced to finding a minimum-sized bipartite graph covering using complete bipartite subgraphs. Below, we present a heuristic for finding a near-optimal solution; its efficiency and effectiveness was experimentally evaluated and this evaluation will be discussed below.

The heuristic consists of two steps: finding rectangles embedded in M and using them to create a covering of M.

Finding a Rectangle Covering

Figures 6, 7:
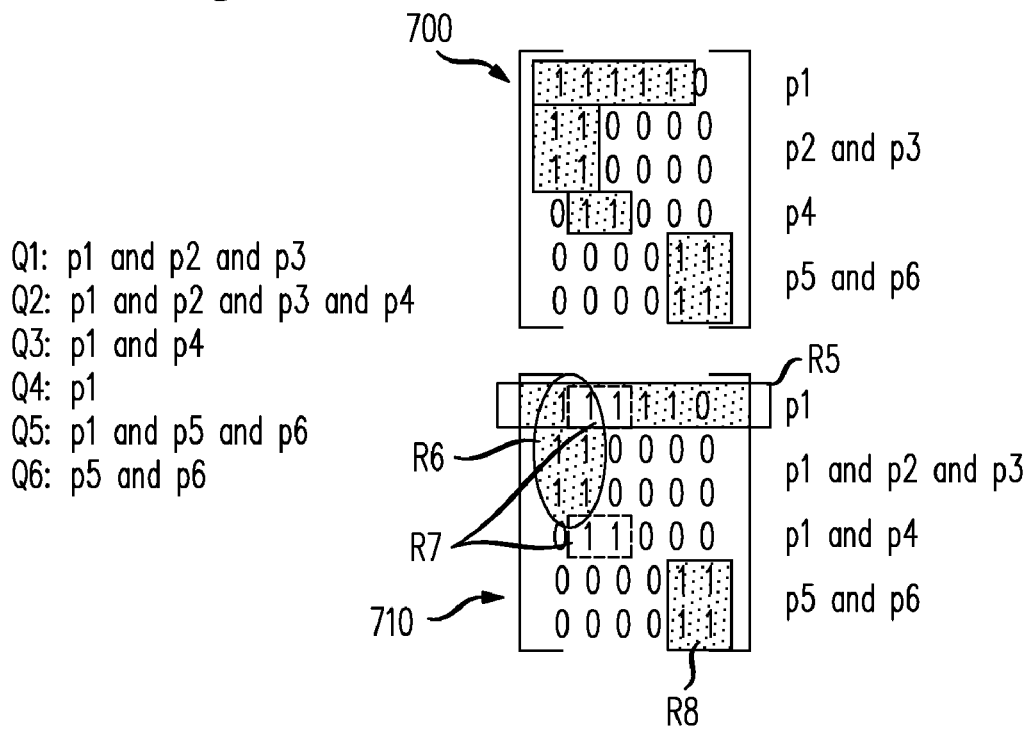
FIG. 6 is a flowchart showing a method for finding rectangles in a matrix of predicates according to the invention.
FIG. 7 is a diagram showing alternate minimum-sized rectangle coverings for the same query set.

Finding rectangles in M can be accomplished by the algorithm shown in FIG. 6. The basic idea is to use rectangles representing i base predicates to generate new rectangles with i+1 base predicates. In steps 2 through 6 of FIG. 6, we initialize a set BASE corresponding to the base predicates, as well as the target set of rectangles RECTS. The latter initially contains all the rows and columns of M. The loop in lines 7 through 12 creates rectangles of size i+1 by attempting to add every possible base predicate (i.e., every rectangle in BASE) to each rectangle of size i. Line 10 tests if each attempt actually creates a new rectangle—all of its i+1 base predicates must occur in more than one query (otherwise, the "new" rectangle is contained in an individual column of M already added to RECTS in line 6). If so, then we add the new rectangle r to RECTS. Its base predicate set is the union of the "old" rectangle's base predicate set and the new base predicate used in line 9. The query set of r consists of queries that reference all of its predicates.

The number of rectangles contained in M may be large, but a variety of pruning rules may be applied while the rectangles are being generated. For instance, we can remove rectangles contained in a newly created rectangle. Recall the rectangle in the bottom-right corner of FIG. 5, which corresponds to the composite predicate (p5 and p6) and may be characterized as: P={5, 6}, Q={5, 6}. This rectangle contains two smaller rectangles, corresponding to base predicates p5 and p6, respectively, i.e., P={5}, Q={5, 6} and P={6}, Q={5, 6}. Once the large rectangle is found, the smaller rectangles may be removed.

Another straightforward optimization technique is to only consider rectangles containing a small number of base predicates, say up to j (i.e., modify line 7 to iterate from 1 to j). The reasoning behind this approach is that we do not expect a very large number of base predicates to be shared across a group of queries.

Finally, having generated a set of rectangles embedded in M, for example by using the algorithm of FIG. 6, we apply the standard greedy heuristic for set-cover-type problems in order to find an approximate solution for the minimum-sized rectangle covering. That is, at each step, we choose the rectangle which covers the most uncovered "ones" in M. Each rectangle in the covering is then translated into the composite predicate that it represents—for example, the four rectangles in FIG. 5 translate into predicates of {p1}, {p2 and p3}, {p4} and {p5 and p6}.

Efficient Evaluation of Prefilter Predicates

At this point, a set of predicates has been selected for evaluation at the prefilter 230, and the predicates have been combined using the rectangle covering heuristic described above. Each bit may correspond to a unique base predicate or a composite predicate. We next discuss how the predicates in the prefilter 230 may be efficiently evaluated in the step 420 of the method 400 of FIG. 2B.

First, we consider evaluation in cases where a base predicate is repeated in several bits (composite predicates) in the prefilter. This occurs if the rectangle covering produced in the previous combining step contains overlapping rectangles. For example, FIG. 7 shows two minimum-sized coverings 700 and 710 for the query workload from FIG. 5; the first covering 700 is the non-overlapping covering already shown in FIG. 5 and the second covering 710 contains overlapping rectangles. The overlapping covering 710 consists of four rectangles: R5, the first row of M corresponding to p1; R6, the circled rectangle corresponding to p1 and p2 and p3; R7, the union of the two dotted rectangles giving p1 and p4; and R8, the bottom right rectangle corresponding to p5 and p6. Observe that the overlapping covering yields three prefilter predicates containing p1. As a result, p1 is evaluated redundantly.

The present invention solves this redundancy problem by adding a post-processing step to the rectangle covering heuristic. In this step, we simplify the resulting rectangles (composite predicates) in order to eliminate overlap whenever possible. The idea is to remove a set of base predicates from a composite predicate if a conjunction of those base predicates already has its own bit. In FIG. 7, we note that p1 has its own bit and occurs inside two composite predicates. With p1 removed, these two composite predicates simplify to (p2 and p3), and p4, respectively. At this point, all the rectangles in the covering are non-overlapping. In the general case, more than one iteration of this procedure may be required to make all the possible simplifications. Finally, with all possible overlaps removed, we conform the LFTA signatures Li to the changes in predicate definitions.

Our next evaluation efficiency improvement concerns attribute unpacking. Recall from the explanation of operation of the DSMS 100 of FIG. 1B that the required attributes must be extracted from a newly arrived tuple prior to predicate evaluation. The attribute unpacking process may be expensive for variable-offset and variable-length fields, in which case we must first unpack the field length and offset attributes inside the packet header. We observed that, in many cases, a set of attributes may be unpacked more efficiently as a group (as compared to on-demand unpacking of individual fields done separately by each LFTA). For example, if a TCP packet is embedded in an IP packet, then it is easy to unpack all the TCP header attributes sequentially. Since the prefilter 230 needs to extract all the fields referenced in all of its predicates prior to evaluating them, it can take advantage of group unpacking to a much greater extent than the individual LFTAs 210.

To exploit group unpacking opportunities, it is advantageous to use an optimizer that maintains two statistics for each attribute of the stream S: the cost of unpacking it separately and the cost of unpacking it along with a set of other attributes, typically those at the same protocol layer. After the prefilter predicates have been chosen, the optimizer finds an efficient method of unpacking the required fields. We model this problem in terms of weighted set covering and use a greedy heuristic to obtain the answer: at each step, we choose the group of fields which gives the cheapest overall unpacking cost per field. Such a step may be used for the purpose of assigning priorities to predicates, as discussed above at step 330 of the method 300 of FIG. 2A. Predicates operating on fields with the least unpacking cost may be selected first for inclusion in a prefilter 230 with a limited bit budget.

Reducing Predicates to Match Constrained Resources.

As indicated previously, the number of bits to be used in the prefilter is limited in order to reduce overhead and may be limited by hardware constraints. For workloads containing many queries and unique predicates, it may be the case that even after "compressing" the predicates using the rectangle covering heuristic, we may still have more composite predicates than available bits. Suppose the number of available bits is k. In this situation, we use one of the following two solutions. The first is to take the first k rectangles returned by our covering heuristic, eliminate rectangle overlap (as discussed above), and install the corresponding k predicates in the prefilter. The second solution is used only when the optimizer has accurate predicate selectivity estimates; e.g., if statistics are collected periodically and the selectivities are known not to change over time. In this case, we modify our covering heuristic as follows. Rather than building the covering by always choosing the rectangle which covers the most uncovered "ones" in M, we choose the rectangle (i.e., composite predicate) which yields the biggest decrease in the expected number of LFTA invocations. Assuming that all the predicates are independent, we can calculate the expected number of invocations of a particular LFTA as the product of the selectivities of all of its predicates evaluated at the prefilter. As before, we take the first k rectangles returned by the modified heuristic, eliminate rectangle overlap, and place the resulting k predicates in the prefilter.

Figure 8A:
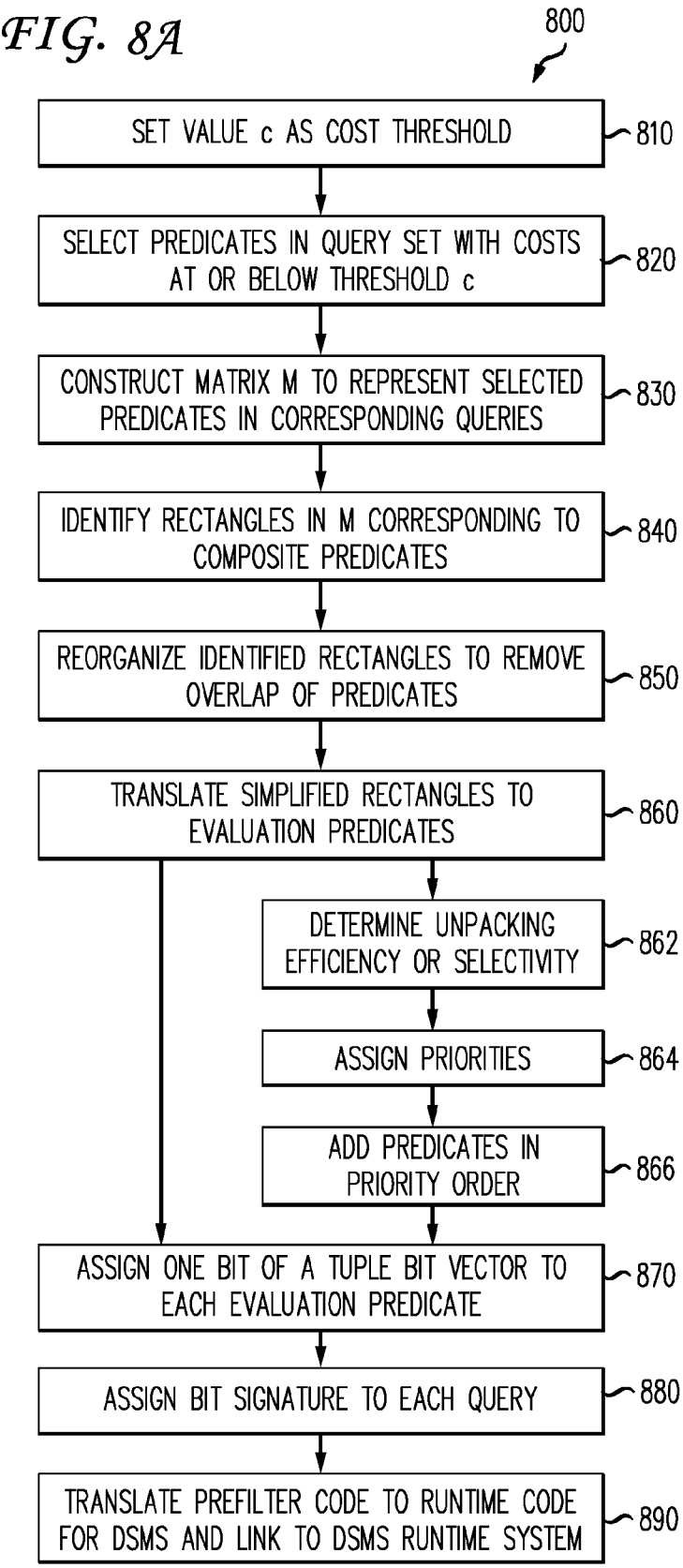
FIG. 8A is a flowchart showing a detailed method for developing a prefilter according to the invention.

FIG. 8A is a flowchart showing a method 800 according to the invention. Method 800 is similar to method 300 of FIG. 2A, but includes more detailed steps as have been described above. In step 810, a value C is set as a cost threshold for cheap predicates. In step 820, all predicates in the query set at or below value C are selected for inclusion in the prefilter. In step 830, a matrix M is constructed to represent the selected predicates and their corresponding queries. In step 840, a rectangle covering heuristic is applied to the matrix M to identify rectangles corresponding to composite predicates. In step 850, the identified rectangles are reorganized to remove rectangle overlap. In step 860, the simplified rectangles are translated into evaluation predicates. In step 870, one bit of a tuple bitmap is assigned to each evaluation predicate. In step 880, a bit signature is assigned to each query. In step 890, the prefilter code is translated to runtime system code (e.g., C code) and linked to the runtime system for the DSMS. For resource constrained systems, after step 860, in step 862, a tuple attribute unpacking efficiency is determined; in step 864, predicates are assigned priorities based on the unpacking efficiency of the attributes they examine; and in step 864, predicates are added to the prefilter in priority order. Such added predicates then are assigned a bit in step 870.

The DTMS then operates in accordance with the method 900 shown in FIG. 8B. In step 910, the runtime process unpacks the attributes required by the prefilter predicates, and in step 920 evaluates the predicates. In step 930, a tuple bitmap is returned with bits representing the existence of predicates in the tuple, and in step 940 the bitmap is compared to query bit signatures. In step 950, queries are invoked if their bit signatures correspond to the tuple bitmap.

Example of Prefilter Use

We have implemented a prefilter as described above in the AT&T Gigascope and tested it on a live network data feed from a data center tap. All of our experiments monitor a high speed DAG4.3GE Gigabit Ethernet interface, which receives approximately 105,000 packets per second (about 400 Mbits per second). All experiments were conducted on dual processor 2.8 GHz P4 server with 4 GB of RAM running FreeBSD 4.10.

We have tested the prefilter on a network monitoring query set developed for an AT&T application. The set contains 22 complex queries (i.e., 22 output streams to which other applications may connect), which in total subscribe to 50 LFTAs. The LFTAs contain 47 cheap predicates (with 10 or fewer operations) that are pushed down to the prefilter. Neither the prefilter nor any of the LFTAs are executed on the network interface card.

Figure 9:
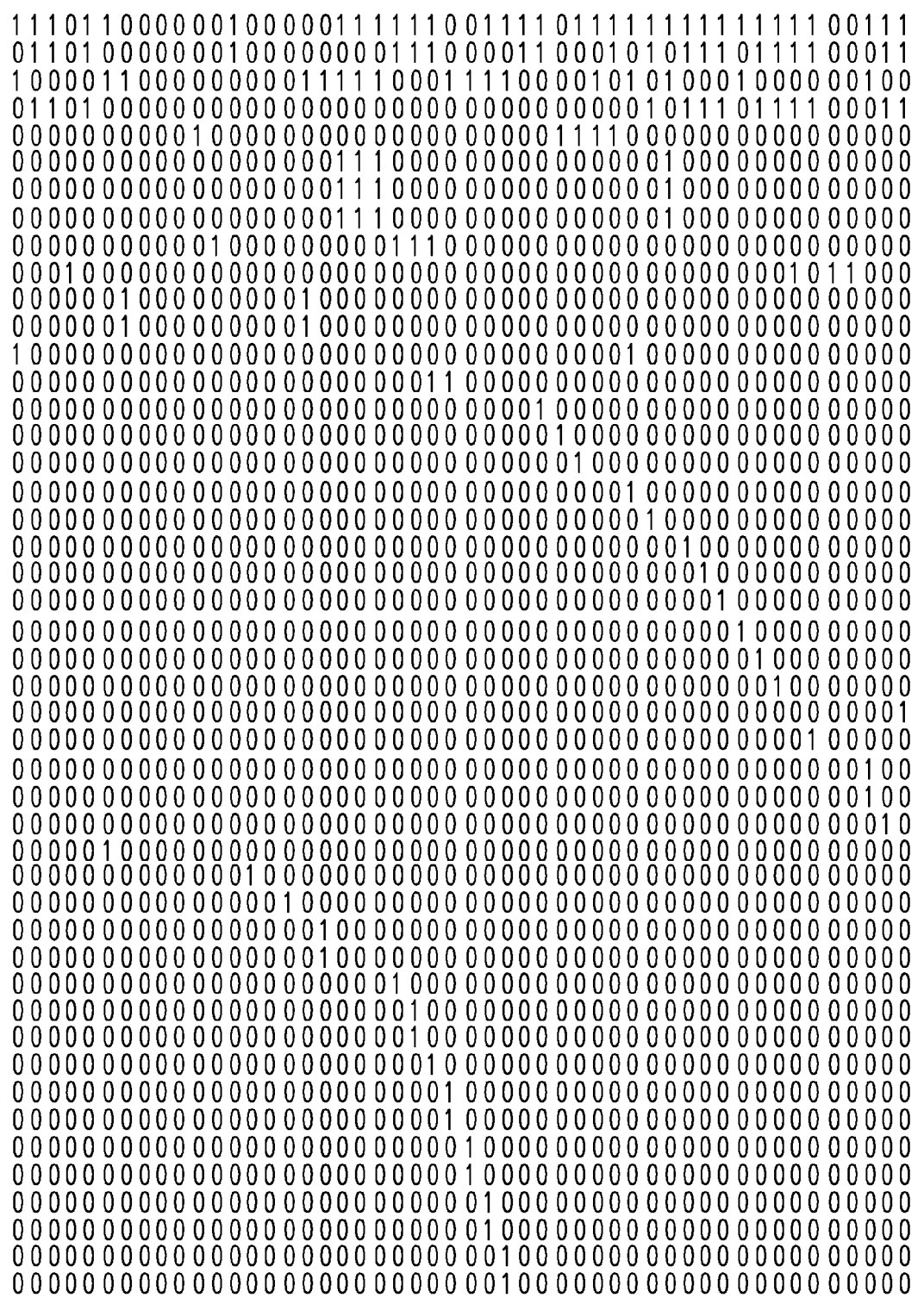

FIG. 9 shows the corresponding matrix M (of size 47×50). In matrix M: (1) The first 14 rows correspond to shared predicates. The remaining 33 prefilter predicates occur in one query each. (2) Four columns are all-zeros, therefore of the 50 LFTAs, 46 contain at least one prefilter predicate. (3) The matrix is quite sparse and contains 116 rectangles. There are 44 "main" rectangles if the pruning rule is used to remove smaller rectangles contained in larger ones. The height of the tallest rectangles is six (i.e., corresponding to rows 1, 3, 6, 7, 8, and 14, and columns 19 and 20).

Performance of the Rectangle Covering Heuristic

Figure 10:
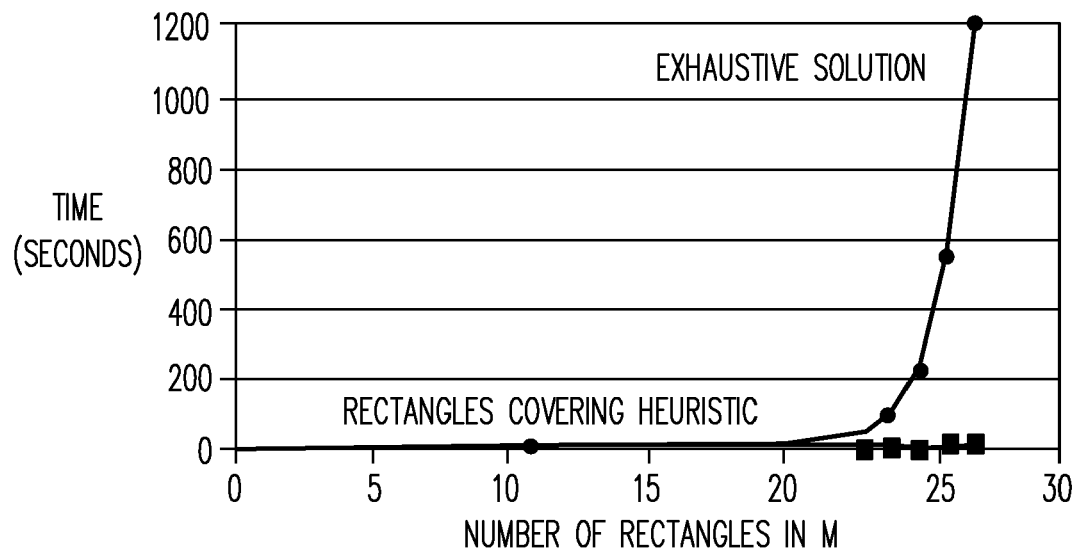

As noted above, the cost of finding a rectangle covering for a matrix M consists of two parts: finding the rectangles in M and then generating the covering. FIG. 10 plots the total time taken by our heuristic and by an exhaustive approach as a function of the number of rectangles in the matrix representation of the query workload. The exhaustive approach examines every permutation of the rectangles in order to find a minimum-sized covering, starting with all sets of one rectangle each and working upwards. Therefore, its time complexity is exponential in the number of rectangles. As shown in the graph, the exhaustive technique requires over 1000 seconds (over 20 minutes) to find a covering when M contains 27 rectangles. Therefore, the optimal algorithm is intractable over our query set, even if rectangle pruning is used. In contrast, our heuristic can handle hundreds of rectangles in a fraction of a second, with the majority of the processing time taken by the rectangle finding algorithm from FIG. 6, not the rectangle cover selection process.

Figure 11:
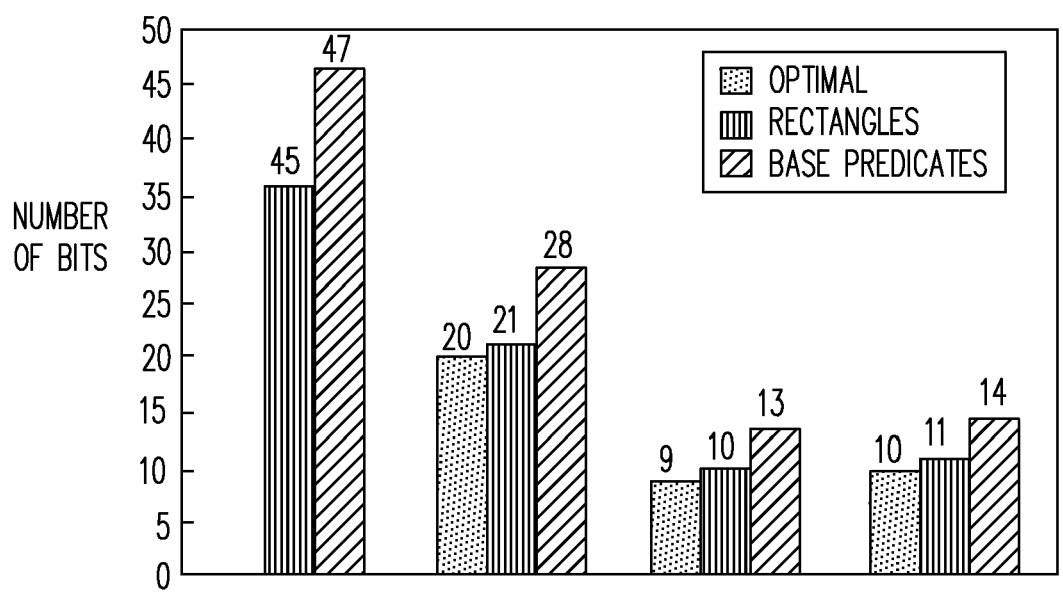

In FIG. 11, we show in bar graph form the effectiveness of the rectangle covering heuristic by comparing the number of bits it requires versus the optimal solution and the number of base predicates. The first set of bars on the left corresponds to our query set; note that we did not obtain the optimal solution in a reasonable time. As shown, the rectangle covering heuristic can represent the 47 prefilter predicates using only 36 bits. The next set of bars corresponds to a subset of our query set consisting of the first 29 queries. This subset contains 28 base predicates, 96 rectangles, and 27 main rectangles (which is small enough to compute the optimal solution in under one hour). In this case, our heuristic represents the 28 base predicates using 21 bits, one bit more than the optimal solution. Finally, the two sets of bars on the right correspond to two smaller query sets used for network monitoring at AT&T. In both cases, our heuristic reduces the number of bits needed by the prefilter and is only one bit away from the optimal solution.

Performance of the Prefilter

Next, we report the performance of Gigascope DSMS with and without the prefilter. Our experiments proceeded in two stages. First, we obtained selectivity estimates of the 47 base predicates by creating 47 COUNT (*) queries, each with one of the base predicates in its WHERE clause. Next, we compiled two versions of the prefilter: one that chooses the rectangle covering without considering selectivities, and one that chooses rectangles according to the expected number of LFTA invocations. For each version, we experimented with several different bit budgets, from one to 36.

Figure 12:
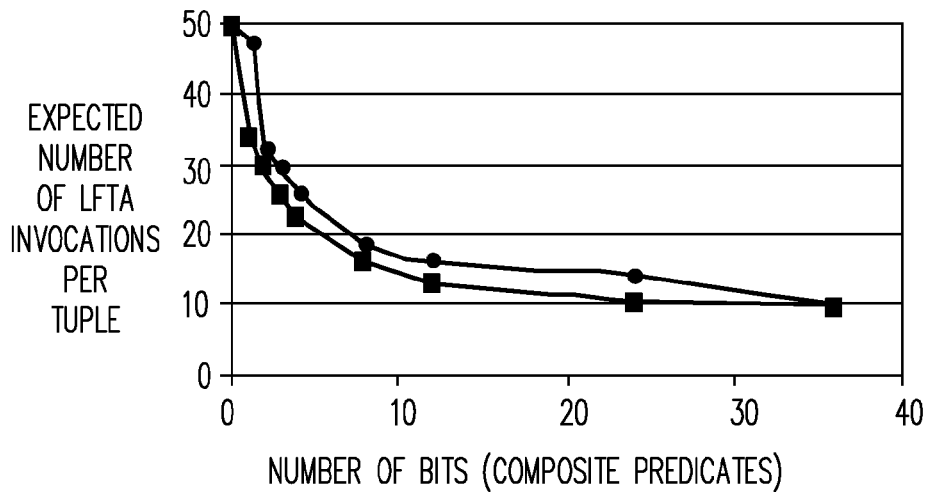

The expected performance of the two strategies in terms of the expected number of LFTA invocations per tuple, assuming that our selectivity estimates remain accurate, is plotted in FIG. 12 for various numbers of bits in the prefilter, up to 36 (which is enough to represent all 47 base predicates). Note that when the number of bits is zero, the prefilter is disabled and therefore all 50 LFTAs are invoked for each new tuple. Using 36 bits, fewer than ten LFTAs are expected to be invoked; at this point, using predicate selectivities does not matter as all the composite predicates fit in the prefilter anyway. If fewer than 36 bits are available, then the knowledge of (accurate) selectivities can potentially improve performance, but not by a significant margin. Moreover, note that even using as few as ten bits is expected to yield a noticeable performance improvement.

After gathering the selectivity estimates, we immediately executed our experiments with the two versions of the prefilter and using various numbers of bits. Each experiment was performed serially on live traffic data, and hence there is a significant amount of noise error in our results. However, the network feed represents the aggregation of a very large number of users, and tends to be stable over short periods of time (but not over the long run; e.g., morning vs. evening traffic or weekdays vs. weekends). As a result, the selectivity estimates obtained just prior to running the experiments were still accurate, aside from ignoring correlations across predicates due to the independence assumption.

For each experiment, we report the CPU utilization of the run-time system, which executes the prefilter and the LFTAs; the CPU consumption of all the HFTAs combined amounted to less than 25 percent and is not affected by the prefilter. For each data point, we collected the average packet rate as well as the CPU utilization. We then normalized the CPU utilization by the average packet rate to obtain the equivalent utilization at 105,000 packets/sec (the most common packet rate over the course of the experiments). We observed that the CPU utilization of the runtime system alone (i.e., processing every packet, but not running any queries) was 8.8 percent with the prefilter, and 8.7 percent with the prefilter turned off. Thus, the prefilter is not a source of overhead.

Figure 13:
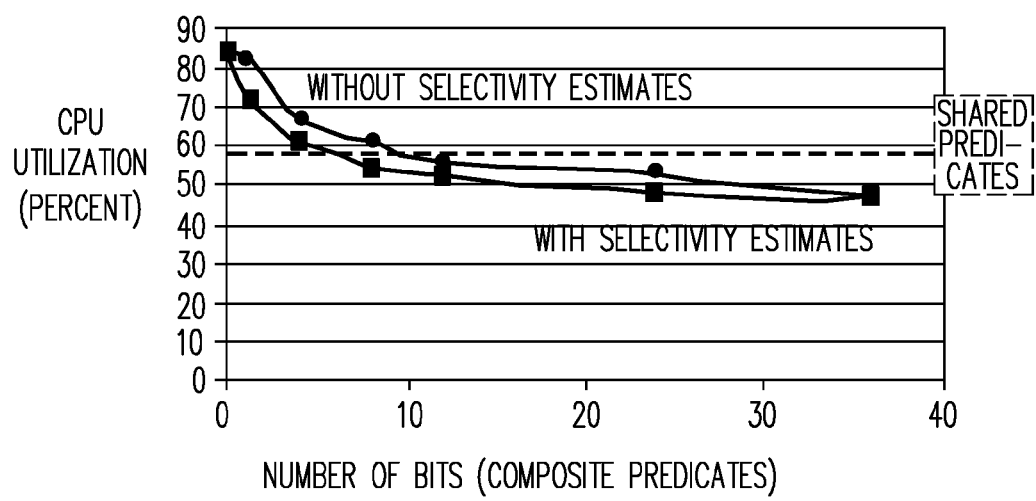

FIG. 13 shows the CPU utilization of the runtime system for the variants of the prefilter described above. First, we note that without the prefilter (i.e., when the number of bits is zero), the CPU usage is over 80 percent. However, we noticed that there was packet loss at the LFTAs (but Gigascope was unable to boost the priority of the process without starving the HFTAs). There was also packet loss with one bit (with or without selectivity estimates). However, increasing the bit budget to four brought the CPU utilization down below 70 percent and eliminated packet loss. Further increasing the bit budget caused a gradual decrease of CPU utilization, down to 47 percent when all 36 composite predicates were included. As expected, selectivity knowledge yielded moderate improvement of less than ten percent. Again, this improvement is likely to vanish (or even become negative) as time goes on and the selectivity estimates get stale.

The dotted horizontal line in FIG. 13 represents the CPU utilization (roughly 58 percent) achieved by evaluating the 14 shared cheap predicates at the prefilter. This shows the benefit ascribable to multi-query optimization, although we have found it unnecessary to use the selectivity estimates this traditional optimization technique requires. Due to the relatively high costs of LFTA invocation, the additional benefit of pushing down non-shared predicates for even greater data reduction can be seen in FIG. 13 as well, as we show reduced CPU utilization, even without selectivity estimates, for all examples greater than 14 bits. When all 36 composite predicates are included, CPU utilization drops from 58 percent to 47 percent, a substantial improvement.

From the foregoing results, several advantages of the present invention become apparent:

A. The rectangle covering heuristic very quickly finds near optimal solutions in terms of the number of bits needed to represent a set of prefilter predicates B. The prefilter significantly reduces the CPU utilization of the LFTAs, even if only a subset of the candidate predicates is pushed down. This means that 1) the prefilter may be evaluated efficiently on network hardware, where the bit budget is smaller, and 2) even if the query set is very large, we should be able to find a small set of prefilter predicates that will greatly reduce the number of LFTA invocations.

C. Selectivity estimates are not necessary for the prefilter to be effective.

Thus, the invention describes a feature enabling a prefilter to be constructed that improves the performance of a DSMS. The improved feature includes both system and method aspects. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. A high speed data stream monitoring system for monitoring and ascertaining desired characteristics of a high speed data stream flowing in a network, the data in the data stream being in the form of serial tuples, the monitoring system comprising:

means for evaluating new tuples arriving in the stream, the means for evaluating including computation means for running a query plan on new tuples arriving in the stream, the query plan including a set of high level queries and a set of different low level queries, the low level queries being characterized by different sets of predicates to be evaluated on the tuples as part of the queries, the set of different low level queries including a plurality of different low level queries sharing a common predicate, a predicate prefilter outside of the query plan that includes a set of predicates selected from the low level query predicates including a common predicate shared by different low level queries and that evaluates the selected predicates on a new tuple arriving in the stream before running any of the low level queries on the tuple and produces a predicate signature for each new tuple in response to the evaluation;

means for assigning a predicate signature to each of the low level queries, means for determining those low level queries which have a predicate signature compatible with the predicate signature of the tuple produced by the prefilter;

means for applying to the tuple only those low level queries determined to have a predicate signature compatible with the predicate signature of the tuple produced by the prefilter, along with selected high level queries, to ascertain the desired characteristics of the high speed data stream;

whereby low level queries that do not have a compatible bit signature are not applied to the tuple by the monitoring system and the computation means has a computation load for running the query plan that is reduced.

2. The high speed data stream management system claimed in claim 1 wherein the high level queries are high level filtering-transformation-aggregation queries and the low level queries are low level filtering-transformation-aggregation queries.

3. The high speed data stream management system claimed in claim 1 wherein the predicates selected to be evaluated in the prefilter have an execution cost that is less than a value C, where C is an execution cost chosen to be less than the execution cost of executing a low level query.

4. The high speed data stream management system claimed in claim 3 wherein the predicates selected to be evaluated in the prefilter include both base predicates and groups of base predicates that are present in the low level queries.

5. The high speed data stream management system claimed in claim 4 wherein the groups of base predicates are selected to reduce overlapping predicates.

6. The high speed data stream management system claimed in claim 3 wherein the predicates selected to be evaluated in the prefilter are the predicates that require the fewest attribute unpacking operations to evaluate.

7. The high speed data stream management system claimed in claim 1 wherein the predicate signature for each tuple is a bit vector with bits representing the presence and absence of selected predicates in the tuple, and wherein the predicate signature assigned to a low level query has bits representing predicates that are required to be present by the low level query, and wherein the means for invoking a low level query compares the bits in the tuple bit vector with the bits in the low level query bit signature.

8. A method for operating a high speed data stream monitoring system for monitoring and ascertaining desired characteristics of a high speed data stream flowing in a network, the data in the data stream being in the form of serial tuples, the monitoring method evaluating new tuples arriving in the stream with computation means running a query plan on new tuples arriving in the stream, the query plan including a set of high level queries and a set of different low level queries, the low level queries being characterized by sets of different predicates to be evaluated on the tuples as part of the queries, the set of different low level queries including a plurality of different low level queries sharing a common predicate, the method comprising:

prefiltering the tuples outside of the query plan with a set of predicates selected from the low level query predicates including a common predicate shared by different low level queries to evaluate a new tuple arriving in the stream before running any of the low level queries on the tuple and to determine if the selected predicates evaluate to true in the tuple;

generating a tuple predicate signature representing the selected predicates that evaluate to true in the tuple;

assigning a predicate signatures to each of the low level queries determining those low level queries that have signatures that are compatible with the tuple predicate signature;

applying to the tuple only those low level queries determined to have signatures compatible with the tuple predicate signature, along with selected high level queries, to ascertain the desired characteristics of the high speed data stream;

whereby low level queries that have predicate signatures that are not compatible with the tuple predicate signature are not applied to the tuple and the computation means has a computational load for running the query plan that is reduced.

9. The method claimed in claim 8 wherein the selected predicates evaluated by prefiltering have an execution cost that is less than a value C, where C is a cost chosen to be less than the cost of executing a low level query.

10. The method claimed in claim 9 where the predicates selected to be evaluated by prefiltering include both base predicates and groups of base predicates that are present in the low level queries.

11. The method claimed in claim 10 where the groups of base predicates have been selected to reduce overlapping predicates.

12. The method claimed in claim 9 where the predicates selected to be evaluated by prefiltering are predicates selected to require the fewest attribute unpacking operations to evaluate.

13. The method claimed in claim 8 wherein the predicate signature for each tuple is a bit vector with bits representing the presence and absence of selected predicates in the tuple, and wherein the predicate signature assigned to a low level query has bits representing predicates that are required to be present by the low level query, and wherein invoking a query compares the bits in the tuple bit vector with the bits in the low level query bit signature.

14. The method claimed in claim 8 wherein the high level queries are high level filtering-transformation-aggregation queries and the low level queries are low level filtering-transformation-aggregation queries.

15. A method for selecting predicates to be evaluated in a prefilter in a high speed data stream monitoring system for monitoring and ascertaining desired characteristics of a high speed data stream flowing in a network, the data in the data stream being in the form of serial tuples, the monitoring method evaluating new tuples arriving in the stream with computation means running a query plan on new tuples arriving in the stream, the query plan including a set of high level queries and a set of different low level queries, the different low level queries being characterized by different sets of predicates to be evaluated on the tuples and each of the low level queries being assigned a predicate signature, the prefilter evaluating a new tuple arriving in the stream before running any of the low level queries on the tuple with predicates selected from the low level query predicates to determine if the selected predicates are present in the tuple and to create a tuple predicate signature to be compared to a predicate signature assigned to a low level query to cause the computation means to apply to the tuple only those low level queries on the tuple that have a predicate signature matching the tuple predicate signature, the prefilter predicate selection method comprising:

identifying base predicates in the low level queries;

establishing an execution cost C for processing of predicates, where C is chosen to be less than the cost of executing a low level query;

selecting base predicates with a cost level below the established level C; and placing the selected base predicates with a cost level below the established level C in the prefilter.

16. The method claimed in claim 15 further comprising:
combining the selected base predicates into groups of two or more predicates present in one or more low level queries.

17. The method claimed in claim 16 wherein combining the base predicates into groups comprises:
constructing a matrix M to represent the predicates with a cost level below the established level C and their corresponding low level queries; and
applying a rectangle covering heuristic to the matrix M to locate groups of predicates present in one or more low level queries.

18. The method claimed in claim 17 further comprising:
removing rectangle overlaps to produce a set of groups of predicates which do not duplicate predicate presence in the groups.

19. The method claimed in claim 16 wherein the predicates are assigned priority according to the attribute unpacking operations that are required to evaluate them.

20. The method claimed in claim 15 wherein the prefilter has a limited bit budget, further comprising:
assigning a priority to the selected predicates; and
adding the selected predicates to the prefilter to the limit of the bit budget in priority order.

21. The method claimed in claim 20 wherein the predicates are selected by constructing a matrix M to represent the predicates and their corresponding queries, and a rectangle covering heuristic is applied to the matrix M to locate groups of predicates present in one or more queries, and wherein the predicates are assigned priority according to their identification by the rectangle covering heuristic.

22. The method claimed in claim 20 wherein the predicates are assigned priority according to their selectivities such that their choice will result in minimum application of low level queries.

23. The method as claim in claim 15 wherein the established execution cost C is 10 operations.

* * * * *